(12) United States Patent
Nguyen et al.

(10) Patent No.: US 8,244,648 B2
(45) Date of Patent: Aug. 14, 2012

(54) METHOD AND SYSTEM FOR PROVIDING A DISTRIBUTED ADAPTIVE RULES BASED DYNAMIC PRICING SYSTEM

(75) Inventors: Loc Nguyen, San Francisco, CA (US); Ayman Hammad, Pleasanton, CA (US); Patrick Gauthier, Mountain View, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 13/185,241

(22) Filed: Jul. 18, 2011

(65) Prior Publication Data

US 2012/0016756 A1    Jan. 19, 2012

Related U.S. Application Data

(63) Continuation of application No. 10/678,034, filed on Sep. 30, 2003, now Pat. No. 8,005,763.

(51) Int. Cl.
*G06Q 99/00* (2006.01)
(52) U.S. Cl. .................. 705/400; 705/14.65; 705/14.38; 705/16; 705/26.1
(58) Field of Classification Search .................. 705/400, 705/14.65, 14.38, 16, 26.1
See application file for complete search history.

(56) References Cited

U.S. PATENT DOCUMENTS

| | | | |
|---|---|---|---|
| 3,935,933 | A | 2/1976 | Tanaka et al. |
| 4,011,433 | A | 3/1977 | Tateisi et al. |
| 4,108,350 | A | 8/1978 | Forbes, Jr. |
| 4,124,109 | A | 11/1978 | Bissell et al. |

(Continued)

FOREIGN PATENT DOCUMENTS

AU         200039412 A1    12/2000
(Continued)

OTHER PUBLICATIONS

"Internet Based Secure Transactions Using Encrypting Applets and CGI-Scripts Independent of Browser or Server Capabilities"; 1998; pp. 800-801; No. 410116; IBM Research Disclosure.

*Primary Examiner* — Akiba Allen
(74) *Attorney, Agent, or Firm* — Kilpatrick Townsend & Stockton LLP

(57) ABSTRACT

A system for providing distributed control to process transactions is disclosed. The system includes a service provider system having associated therewith a number of rules and a number of meta-rules, a point of service device having associated therewith a number of rules and a number of meta-rules, and a portable device having associated therewith a number of rules and a number of meta-rules. The portable device uses its associated rules to determine an outcome for a transaction. If the portable device is unable to determine the outcome for the transaction, the portable device uses its associated meta-rules to either determine whether one or more of its associated rules can be altered locally in order to determine the outcome or request the point of service device to help determine the outcome using the rules and meta-rules associated with the point of service device. If the point of service device is unable to determine the outcome using its associated rules, the point of service device uses its associated meta-rules to either determine whether one or more of its associated rules can be altered locally in order to determine the outcome or request the service provider system to help determine the outcome using the rules and meta-rules associated with the service provider system.

20 Claims, 6 Drawing Sheets

U.S. PATENT DOCUMENTS

| | | |
|---|---|---|
| 4,195,864 A | 4/1980 | Morton et al. |
| 4,412,631 A | 11/1983 | Haker |
| 4,544,590 A | 10/1985 | Egan |
| 4,568,403 A | 2/1986 | Egan |
| 4,649,515 A | 3/1987 | Thompson et al. |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,970,658 A * | 11/1990 | Durbin et al. .................. 706/60 |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,412,756 A | 5/1995 | Bauman et al. |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,899,998 A | 5/1999 | McGauley et al. |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,019 A | 6/1999 | Ginter et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |

| | | | | | | |
|---|---|---|---|---|---|---|
| 6,009,411 | A | 12/1999 | Kepecs | 2003/0055792 A1* | 3/2003 | Kinoshita et al. ............... 705/67 |
| 6,012,635 | A | 1/2000 | Shimada et al. | 2003/0093344 A1 | 5/2003 | Sesek |
| 6,014,634 | A | 1/2000 | Scroggie et al. | 2003/0187794 A1* | 10/2003 | Irwin et al. ............... 705/40 |
| 6,024,286 | A | 2/2000 | Bradley et al. | 2004/0141661 A1 | 7/2004 | Hanna et al. |
| 6,035,280 | A | 3/2000 | Christensen | 2004/0204078 A1* | 10/2004 | Fare et al. ............... 455/557 |
| 6,038,551 | A | 3/2000 | Barlow et al. | 2005/0076110 A1 | 4/2005 | Mathew et al. |
| 6,041,309 | A | 3/2000 | Laor | 2005/0172033 A1* | 8/2005 | Mathew et al. ............... 709/246 |
| 6,047,325 | A | 4/2000 | Jain et al. | | | |
| 6,049,778 | A | 4/2000 | Walker et al. | FOREIGN PATENT DOCUMENTS | | |
| 6,052,468 | A | 4/2000 | Hillhouse | BE | 1002756 A6 | 5/1991 |
| 6,052,690 | A | 4/2000 | De Jong | CA | 2293944 A1 | 8/2000 |
| 6,052,785 | A | 4/2000 | Lin et al. | CA | 2267041 A1 | 9/2000 |
| 6,055,509 | A | 4/2000 | Powell | CA | 2317138 A1 | 1/2002 |
| 6,061,660 | A | 5/2000 | Eggleston et al. | DE | 19522527 A1 | 1/1997 |
| 6,067,526 | A | 5/2000 | Powell | DE | 19848712 A1 | 4/2000 |
| 6,070,147 | A | 5/2000 | Harms et al. | DE | 19960978 A1 | 8/2000 |
| 6,073,238 | A | 6/2000 | Drupsteen | DE | 10015103 A1 | 10/2000 |
| 6,076,068 | A | 6/2000 | Delapa | EP | 0203424 A2 | 12/1986 |
| 6,076,069 | A | 6/2000 | Laor | EP | 0292248 A2 | 11/1988 |
| 6,089,611 | A | 7/2000 | Blank | EP | 0475837 A1 | 3/1992 |
| 6,094,656 | A | 7/2000 | De Jong | EP | 0540095 A1 | 5/1993 |
| 6,101,422 | A | 8/2000 | Furlong | EP | 0658862 A2 | 6/1995 |
| 6,101,477 | A | 8/2000 | Hohle et al. | EP | 0675614 A1 | 10/1995 |
| 6,105,002 | A | 8/2000 | Powell | EP | 0682327 A2 | 11/1995 |
| 6,105,865 | A | 8/2000 | Hardesty | EP | 0875841 A2 | 11/1998 |
| 6,105,873 | A | 8/2000 | Jeger | EP | 0936530 A1 | 8/1999 |
| 6,112,987 | A | 9/2000 | Lambert et al. | EP | 0938050 A2 | 8/1999 |
| 6,112,988 | A | 9/2000 | Powell | EP | 0938051 A2 | 8/1999 |
| 6,119,933 | A | 9/2000 | Wong et al. | EP | 0944007 A2 | 9/1999 |
| 6,119,945 | A | 9/2000 | Muller et al. | EP | 0949595 A2 | 10/1999 |
| 6,122,631 | A | 9/2000 | Berbec et al. | EP | 0982692 A2 | 3/2000 |
| 6,129,274 | A | 10/2000 | Suzuki | EP | 0984404 A2 | 3/2000 |
| 6,144,948 | A | 11/2000 | Walker et al. | EP | 1085395 A2 | 3/2001 |
| 6,151,586 | A | 11/2000 | Brown | EP | 1102320 A1 | 5/2001 |
| 6,151,587 | A | 11/2000 | Mathias | EP | 1111505 A1 | 6/2001 |
| 6,154,751 | A | 11/2000 | Ault et al. | EP | 1113387 A2 | 7/2001 |
| 6,161,870 | A | 12/2000 | Blank | EP | 1113407 A2 | 7/2001 |
| 6,164,549 | A | 12/2000 | Richards | EP | 1168137 A1 | 1/2002 |
| 6,170,061 | B1 | 1/2001 | Beser | EP | 1233333 A1 | 8/2002 |
| 6,173,269 | B1 | 1/2001 | Solokl et al. | FR | 2772957 A1 | 6/1999 |
| 6,173,891 | B1 | 1/2001 | Powell | FR | 2793048 A1 | 11/2000 |
| 6,179,205 | B1 | 1/2001 | Sloan | FR | 2794543 A1 | 12/2000 |
| 6,179,710 | B1 | 1/2001 | Sawyer et al. | FR | 2796176 A1 | 1/2001 |
| 6,183,017 | B1 | 2/2001 | Najor et al. | FR | 2804234 A1 | 7/2001 |
| 6,185,541 | B1 | 2/2001 | Scroggie et al. | GB | 2331381 A | 5/1999 |
| 6,189,100 | B1 | 2/2001 | Barr et al. | GB | 2343091 A | 4/2000 |
| 6,189,878 | B1 | 2/2001 | Meese | GB | 2351379 A | 12/2000 |
| 6,195,666 | B1 | 2/2001 | Schneck et al. | GB | 2355324 A | 4/2001 |
| 6,210,276 | B1 | 4/2001 | Mullins | JP | 2000112864 A | 4/2000 |
| 6,216,014 | B1 | 4/2001 | Proust et al. | JP | 2000181764 A | 6/2000 |
| 6,216,204 | B1 | 4/2001 | Thiriet | JP | 2001202484 A | 7/2001 |
| 6,220,510 | B1 | 4/2001 | Everett et al. | JP | 2001236232 A | 8/2001 |
| 6,222,914 | B1 | 4/2001 | McMullin | KR | 10-2000-0039297 A | 5/2001 |
| 6,230,143 | B1 | 5/2001 | Simons et al. | KR | 2001-0044823 A | 6/2001 |
| 6,237,145 | B1 | 5/2001 | Narasimhan et al. | KR | 2001-0058742 A | 7/2001 |
| 6,241,287 | B1 | 6/2001 | Best et al. | KR | 2002-0021237 A | 3/2002 |
| 6,243,687 | B1 | 6/2001 | Powell | WO | WO 90/16126 A1 | 12/1990 |
| 6,243,688 | B1 | 6/2001 | Kalina | WO | WO 96/25724 A1 | 8/1996 |
| 6,244,958 | B1 | 6/2001 | Acres | WO | WO 96/38945 A1 | 12/1996 |
| 6,266,647 | B1 | 7/2001 | Fernandez | WO | WO 96/42109 A1 | 12/1996 |
| 6,267,263 | B1 | 7/2001 | Emoff et al. | WO | WO 97/05582 A1 | 2/1997 |
| 6,269,158 | B1 | 7/2001 | Kim | WO | WO 97/10562 A1 | 3/1997 |
| 6,279,112 | B1 | 8/2001 | O'Toole, Jr. et al. | WO | WO 97/39424 A1 | 10/1997 |
| 6,282,516 | B1 | 8/2001 | Giuliani | WO | WO 98/02834 A1 | 1/1998 |
| 6,292,785 | B1 | 9/2001 | McEvoy et al. | WO | WO 98/09257 A1 | 3/1998 |
| 6,292,786 | B1 | 9/2001 | Deaton et al. | WO | WO 98/20465 A1 | 5/1998 |
| 6,296,191 | B1 | 10/2001 | Hamann et al. | WO | WO 98/43169 A2 | 10/1998 |
| 6,299,530 | B1 | 10/2001 | Hansted et al. | WO | WO 98/43212 A1 | 10/1998 |
| 6,321,208 | B1 | 11/2001 | Barnett et al. | WO | WO 98/52153 A2 | 11/1998 |
| 6,385,723 | B1 | 5/2002 | Richards | WO | WO 99/10824 A1 | 3/1999 |
| 6,390,374 | B1 | 5/2002 | Carper et al. | WO | WO 99/16030 A1 | 4/1999 |
| 6,480,935 | B1 | 11/2002 | Carper et al. | WO | WO 99/19846 A2 | 4/1999 |
| 6,549,773 | B1 | 4/2003 | Linden et al. | WO | WO 99/44172 A1 | 9/1999 |
| 6,549,912 | B1 | 4/2003 | Chen | WO | WO 99/45507 A1 | 9/1999 |
| 6,612,490 | B1 | 9/2003 | Herrendoerfer et al. | WO | WO 99/49415 A2 | 9/1999 |
| 6,681,995 | B2 | 1/2004 | Sukeda et al. | WO | WO 99/49426 A1 | 9/1999 |
| 6,689,345 | B2 | 2/2004 | Lezer | WO | WO 00/39714 A1 | 7/2000 |
| 2002/0002468 | A1 | 1/2002 | Spagna et al. | WO | WO 00/46665 A2 | 8/2000 |
| 2002/0076051 | A1 | 6/2002 | Nii | | | |

| | | | |
|---|---|---|---|
| WO | WO 00/54507 A1 | 9/2000 |
| WO | WO 00/57315 A2 | 9/2000 |
| WO | WO 00/57613 A1 | 9/2000 |
| WO | WO 00/62265 A1 | 10/2000 |
| WO | WO 00/62472 A1 | 10/2000 |
| WO | WO 00/67185 A1 | 11/2000 |
| WO | WO 00/68797 A1 | 11/2000 |
| WO | WO 00/68902 A1 | 11/2000 |
| WO | WO 00/68903 A1 | 11/2000 |
| WO | WO 00/69183 A2 | 11/2000 |
| WO | WO 00/75775 A2 | 12/2000 |
| WO | WO 00/77750 A1 | 12/2000 |
| WO | WO 01/04851 A1 | 1/2001 |
| WO | WO 01/06341 A1 | 1/2001 |
| WO | WO 01/08087 A1 | 2/2001 |
| WO | WO 01/13572 A1 | 2/2001 |
| WO | WO 02/15037 A1 | 2/2001 |
| WO | WO 01/15397 A1 | 3/2001 |
| WO | WO 01/18633 A1 | 3/2001 |
| WO | WO 01/18746 A1 | 3/2001 |
| WO | WO 01/29672 A1 | 4/2001 |
| WO | WO 01/33390 A2 | 5/2001 |
| WO | WO 01/40908 A2 | 6/2001 |
| WO | WO 01/42887 A2 | 6/2001 |
| WO | WO 01/44900 A2 | 6/2001 |
| WO | WO 01/44949 A2 | 6/2001 |
| WO | WO 01/47176 A1 | 6/2001 |
| WO | WO 01/50229 A2 | 7/2001 |
| WO | WO 01/52575 A1 | 7/2001 |
| WO | WO 01/55955 A1 | 8/2001 |
| WO | WO 01/59563 A1 | 8/2001 |
| WO | WO 01/61620 A1 | 8/2001 |
| WO | WO 01/65545 A1 | 9/2001 |
| WO | WO 01/67694 A1 | 9/2001 |
| WO | WO 01/71648 A2 | 9/2001 |
| WO | WO 01/71679 A2 | 9/2001 |
| WO | WO 01/73530 A2 | 10/2001 |
| WO | WO 01/73533 A1 | 10/2001 |
| WO | WO 01/78020 A1 | 10/2001 |
| WO | WO 01/80563 A1 | 10/2001 |
| WO | WO 01/84377 A2 | 11/2001 |
| WO | WO 01/84474 A2 | 11/2001 |
| WO | WO 01/84512 A1 | 11/2001 |
| WO | WO 01/88705 A1 | 11/2001 |
| WO | WO 02/06978 A1 | 1/2002 |
| WO | WO 02/10962 A1 | 2/2002 |
| WO | WO 02/14991 A2 | 2/2002 |
| WO | WO 02/21315 A1 | 3/2002 |
| WO | WO 02/29577 A2 | 4/2002 |
| WO | WO 02/088895 A2 | 11/2002 |

\* cited by examiner

*T*:Price Computation Operator

Price = *T*(input_States)

*M*:Transaction Operator Equivalence function $T_y = M(T_1, T_2, T_3, \ldots T_n)$ if $P(T_y) \geq P(T_1, T_2, T_3, \ldots, T_n)$

METHOD AND SYSTEM FOR PROVIDING A DISTRIBUTED ADAPTIVE RULES BASED DYNAMIC PRICING SYSTEM

CROSS-REFERENCES TO RELATED APPLICATIONS

This application is a continuation of U.S. patent application Ser. No. 10/678,034, filed Sep. 30, 2003, entitled "METHOD AND SYSTEM FOR PROVIDING A DISTRIBUTED ADAPTIVE RULES BASED DYNAMIC PRICING SYSTEM, the disclosure of which is hereby incorporated by reference in its entirety for all purposes.

BACKGROUND OF THE INVENTION

In today's environment, promotion systems often include point of service or sale devices and portable devices. Such systems generally utilize a set of rules to manage and process transactions. Typically, these rules are centrally managed and elements of the rules or the data used in their application are distributed from a central location, such as a server, to the points of service as needed from time to time on a transaction-by-transaction basis. As a result, the bulk of the programming administration is performed at the central location. Conversely, limited transaction processing is performed on the part of the portable devices and/or the point of service devices.

A number of situations often lead to sub-optimal use of such systems, thereby resulting in service delivery that does not meet the performance expectation of the service provider or user. Examples of such situations would include cases where data would be missing or corrupted at the point of service, where the central system would fail to update the rules and data used by the point of service device in a timely fashion, and where centrally defined rules cannot accommodate the variety of situations at the point and time of service, etc.

Sub-optimal use includes, for example, a promotion system where the promotional messages used in the portable devices are out of date; a rewards system where the incentive programs in the system are not delivering consumer appeal; and a price definition system where the dynamic shifts of demand and offer at a particular outlet are not properly integrated in a timely manner.

In addition, conventional systems also limit interactions between service providers that would allow them to jointly optimize the delivery of their services, for instance, where the use of certain forms of payment and promotion for certain products and services are tied together.

Hence, it would be desirable to provide a system that is capable of handling and processing transactions more efficiently in a distributed manner.

BRIEF SUMMARY OF THE INVENTION

In one exemplary embodiment, a system for providing distributed control to process transactions is provided. The system includes a number of nodes, each node having a node order and having associated therewith a number of rules and a number of meta-rules. The rules use a variety of data as inputs including transaction and event related data, device related data and environment related data. The rules also include one or more rules on communications routing between nodes.

A first node uses its associated rules to determine an outcome for a transaction. If the first node is unable to determine the outcome for the transaction using its associated rules, the first node uses its associated meta-rules to either determine whether one or more of its associated rules can be altered locally in order to determine the outcome or request a second node having a node order that is equal to or higher than that of the first node to help determine the outcome using the rules and meta-rules associated with the second node.

If the second node is unable to determine the outcome using its associated rules, the second node uses its associated meta-rules to either determine whether one or more of its associated rules can be altered locally in order to determine the outcome or request a third node having a node order that is equal to or higher than that of the second node to help determine the outcome using the rules and meta-rules associated with the third node.

Moreover, the first node uses historical transaction information to update the rules and meta-rules associated with a node having a node order that is equal to or lower than that of the first node in order to render processing of transactions more efficient.

Each node is configured to receive an administrative request. Upon a node receiving the administrative request, the node is directed to propagate one or more of its associated plurality of rules or meta-rules to another node.

Each node is also configured to collect data relating to the transactions to allow a system provide to manage or maintain system performance.

In another exemplary embodiment, another system for providing distributed control to process transactions is provided. The system includes a number of service provider systems, each service provider system having associated therewith a number of rules and a number of meta-rules; a number of point of service devices, each point of service device having associated therewith a number of rules and a number of meta-rules; and a number of portable devices, each portable device having associated therewith a number of rules and a number of meta-rules.

A portable device uses its associated rules to determine an outcome for a transaction. If the portable device is unable to determine the outcome for the transaction using its associated rules, the portable device then uses its associated meta-rules to either determine whether one or more of its associated rules can be altered locally in order to determine the outcome or request a point of service device to help determine the outcome using the rules and meta-rules associated with the point of service device. Alternatively, the portable device and the point of service device may use their respective associated rules to determine the outcome for the transaction. If the outcome cannot be reached, the point of service device uses its associated meta-rules to either determine whether one or more of the rules associated with either the portable device or the point of service device can be altered locally to determine the outcome or request another point of service device.

If the point of service device is unable to determine the outcome using its associated rules, the point of service device uses its associated meta-rules to either determine whether one or more of its associated rules can be altered locally in order to determine the outcome or request another point of service device or a service provider system to help determine the outcome using the rules and meta-rules associated respectively with this other point of service device and the service provider system.

Optionally, the system further includes a number of network gateways, each network gateway having associated therewith a number of rules and a number of meta-rules. If the point of service device is unable to determine the outcome using its associated rules, the point of service device uses its associated meta-rules to either determine whether one or more of its associated rules can be altered locally in order to determine the outcome or request another point of service device or a network gateway to help determine the outcome using the rules and meta-rules associated respectively with the point of service device and the network gateway.

If the network gateway is unable to determine the outcome using its associated rules, the network gateway uses its associated meta-rules to either determine whether one or more of its associated rules can be altered locally in order to determine the outcome or request another network gateway or a service provider system to help determine the outcome using the rules and meta-rules associated respectively with this other network gateway and the service provider system.

Moreover, the point of service device uses historical transaction information to update the rules and meta-rules associated respectively with one or more portable devices in order to render processing of transactions more efficient. Similarly, the service provider system uses historical transaction information to update the rules and meta-rules associated respectively with one or more point of service devices and one or more portable devices, and one or more network gateways in order to render processing of transactions more efficient.

In yet another exemplary embodiment, a method for providing distributed control to process transactions is provided. The method includes: maintaining a service provider system having associated therewith a number of rules and a number of meta-rules; maintaining a point of service device having associated therewith a number of rules and a number of meta-rules; maintaining a portable device having associated therewith a number of rules and a number of meta-rules; determining an outcome for a transaction using the rules associated with the portable device; and if the outcome cannot be determined using the rules associated with the portable device, using the meta-rules associated with the portable device to either determine whether one or more of the rules associated with the portable device can be altered locally in order to determine the outcome or request the point of service device to help determine the outcome using the rules and meta-rules associated with the point of service device.

The method also comprises: if the outcome cannot be determined using the rules associated with the point of service device, using the meta-rules associated with the point of service device to either determine whether one or more of the rules associated with the point of service device can be altered locally in order to determine the outcome or request the service provider system to help determine the outcome using the rules and meta-rules associated with the service provider system.

The method further comprises: maintaining a network gateway having associated therewith a number of rules and a number of meta-rules; and if the outcome cannot be determined using the rules associated with the point of service device, using the meta-rules associated with the point of service device to either determine whether one or more of the rules associated with the point of service device can be altered locally in order to determine the outcome or request the network gateway to help determine the outcome using the rules and meta-rules associated with the network gateway.

Moreover, the method comprises: if the outcome cannot be determined using the rules associated with the network gateway, using the meta-rules associated with the network gateway to either determine whether one or more of the rules associated with the network gateway can be altered locally in order to determine the outcome or request the service provider system to help determine the outcome using the rules and meta-rules associated with the service provider system; directing the point of service device to use historical transaction information to update the rules and meta-rules associated with the portable device in order to render processing of transactions more efficient; and directing the service provider system to use historical transaction information to update the rules and meta-rules associated respectively with the portable device and the point of service device in order to render processing of transactions more efficient.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
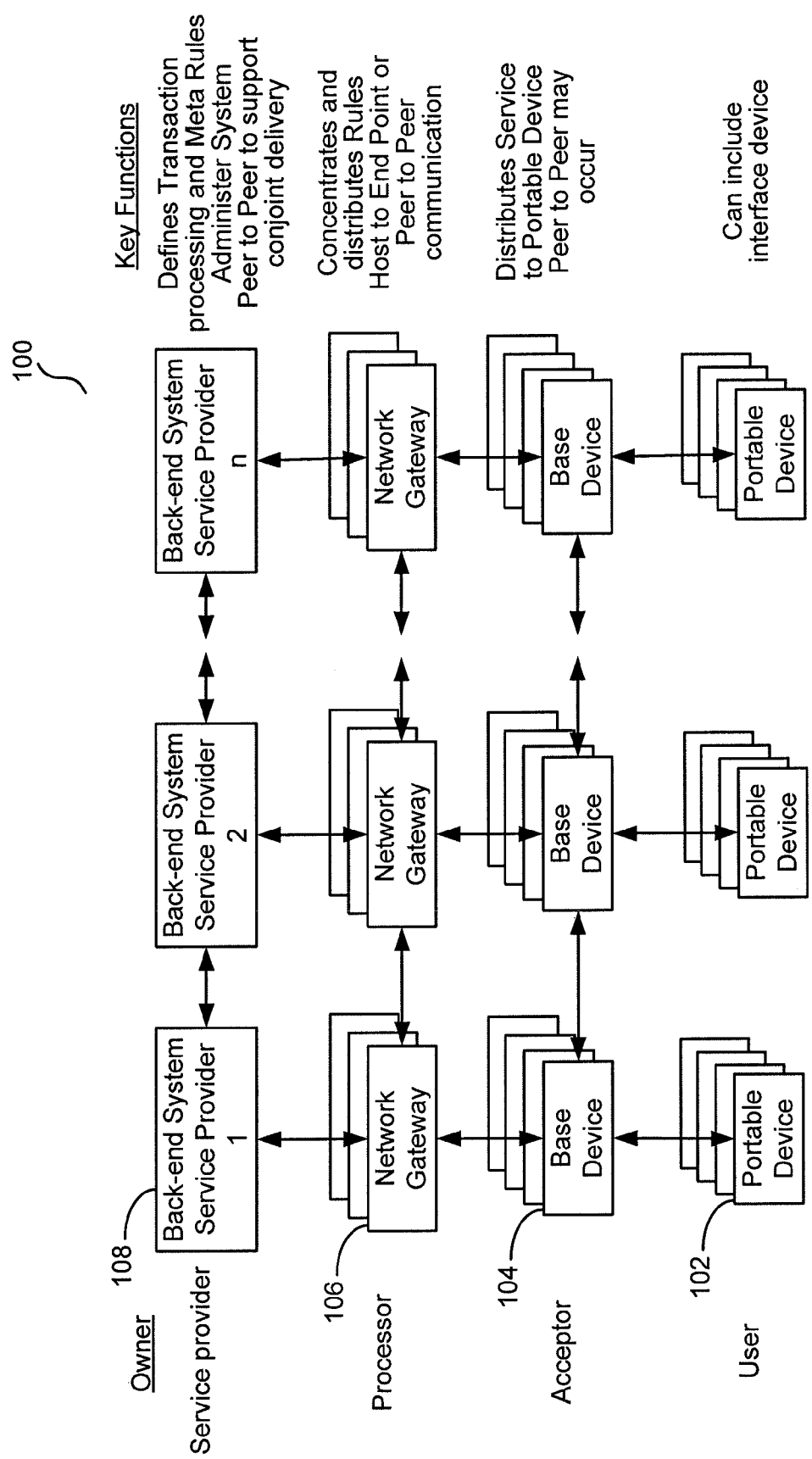
FIG. 1 is a simplified schematic diagram illustrating the system architecture of one exemplary embodiment of the present invention.

The present invention in the form of one or more exemplary embodiments will now be described. As used herein, the following is a glossary of terms with their corresponding definitions:

Portable device: a personal device, with storage and computing ability and sets of unique identifying characteristics, carried by an individual and used to conduct a transaction.

Point of service (sale) device: a device, with storage and computing ability, used to interact with the portable device and, from time to time, with network gateways and/or back-end systems, to conduct a transaction at the point of service or sale.

Back-end system (service provider system): a computing device, separate from the point of service device, that enables the delivery of a service, provides data and software objects required locally for the delivery of the service, and analyzes data about service events/transactions and the point of service state.

Network switch (network gateway): a computing device that enables communications between the point of service devices and the back-end systems and may perform data/transaction processing on behalf of the back-end systems if so configured.

System component (node): a component of the transactional infrastructure; portable devices, point of service devices, network gateways, and back-end systems are the different types of nodes of the system.

Node order: level of authority of a node in the transactional infrastructure; generally, the portable devices have the lowest node order, followed by the point of service devices, the network gateways and the back-end systems in ascending order.

Portable device user: a carrier of the portable device at the time of the transaction with the point of service device.

Portable device issuer: an owner and/or provider of the portable device.

Point of service device operator (acceptor): an entity or person responsible for the operations of the point of service device.

Service provider: a provider of services the delivery of which is enabled by the interaction of the portable device and the point of service device; examples of a service provider include financial institutions providing payment services, merchants providing promotional programs, and product manufacturers.

Network owner (processor): an owner of a network gateway providing connectivity, switching between point of service devices and back-end systems, and optionally, performing transactional processing on behalf of the service providers.

Transaction: a singular interaction between the portable device and the point of service device including a decision related to service delivery; the result of the transaction may be successful, unsuccessful, or in a number of intermediate states as defined by the service provider.

Service request: a call from a system node to a node of a similar (peer to peer) or higher node order to assist in the processing of a transaction based on the rules and meta-rules available at that node.

Administrative request: a call from a system node to a node of a similar (peer to peer) or lower node order to assist in the processing, distribution and management of system data, system states, and distribution of processing rules and meta-rules.

System state: a compilation of states of all components of the transaction system at a given time, including node state, local data, event data and system records; the system state may vary with time.

System performance: average over a period of time of the system states compared to an optimum state.

Service delivery record: a record of past transaction results.

Price computation rules (transaction processing rules): local set of processing rules defining the conditions under which a transaction will be priced locally or referred to a node of a higher order.

Meta-rules: rules governing (1) the definition of equivalence, or substitution between one price computation rule and another; rules are said to be equivalent when their application would result in the same theoretical system performance; rule substitution is the operation by which a node replaces a price computation rule with another to increase the probability of achieving a desired system performance; (2) the administration of the modes, such as viral distribution, of the system management function to service requests like, update of rules and meta-rules and initialization response to the administration request.

Viral distribution (viral transmission): mode of rules propagation not involving a back-end system; propagation occurs when one node provides its rules and meta-rules to another node of equal or lesser order for the purpose of incorporation into the recipient node's sets of rules and meta-rules.

According to one exemplary embodiment, a system is provided for the management and distribution of rules used to determine the allowed price of a product or service to be provided during a transaction. In one aspect, components of the system (nodes), including the back-end systems, the network gateways, the point of service devices, and the portable devices are able to locally utilize corresponding algorithms and/or rules to collectively determine the outcome of a transaction or a service delivery request (transaction processing rule). In one configuration, a service provider initially defines the algorithms and/or rules for all the system nodes that are to be used to process a transaction related to that service provider and may modify such algorithms and/or rules from time to time. As will be further described below, the components are able to adapt these algorithms and/or rules.

In one situation, the universe of possible price computation rules used to determine the price of a product or service is defined by the service provider with the intention of achieving an optimum system performance. The price computation rules may use utilize a variety of data to determine the outcome of the transaction including, for example, environmental data, node data, event (transaction) data including transaction value setting data (such as, price, grades, risk, etc.), system data (such as, node identifier, owner, security classes, scheme participation, etc.), system state data, system components states data, service delivery records, user and service provider data and logs (such as, behavioral data, demographics data, psychographics data, etc.), service logs, observed and desired system performance.

Price computation can be performed in a number of ways. For example, a price computation may be completed at the local node; alternatively, in the case of inconclusive processing at the local node, the price computation can be re-processed either with referral to the local meta-rules for alteration of the local price computation rules or via referral with a service request to a node of a higher order for processing based on the price computation rules and meta-rules stored at that node. Collaborative price computation is performed when a node engages one or more other nodes to participate in the processing of the transaction and/or the adaptation of the rules.

When nodes communicate and propagate to other participating nodes price computation rules and meta-rules, such viral distribution or transmission of rules and meta-rules are defined by the service provider as part of the system's meta-rules. Furthermore, each node can communicate to other nodes its level of participation in response to service requests. The participation level of each node in the system is defined and controlled as part of the meta-rules of the system.

The adaptation of price computation rules is based on rules of equivalence (meta-rules) allowing the substitution of sets of data and associated algorithms between nodes. Such rules of equivalence allow the probability of enhancing system performance to be maximized according to the definition provided by the service provider. The rules of equivalence (meta-rules) are typically defined by the service provider to seek optimization of system performance according to the service provider's business objectives and/or economic model.

The adaptation of price computation rules may happen on a real-time basis as part of the processing of a transaction; or from time to time, using a local node heuristic engine capable of analyzing the node state, node service logs, and available system state data, and based on the local meta-rules; or by receipt of administrative requests.

The meta-rules, or rules of equivalence, are based on the computation and comparison of expected, desired and measured system performance for various price computation rules and the definitions of conditions allowing for the substitution of one set of price computation rules and associated data for another.

The meta-rules are distributed as node to node transactions defined as administrative requests. Response to each administrative request is performed according to pre-existing meta-rules.

The price computation rules and meta-rules are embodied in software agents in each participating node, provided or certified or otherwise recognized by the service provider. The system supports conjoint delivery of services by different service providers. A software agent from one participating service provider may engage a software agent from a different service provider, sharing the same node, to affect the price computation for the delivery of either service or product.

System Nodes

FIG. 1 is a simplified schematic diagram illustrating the system architecture of one exemplary embodiment of the present invention. Referring to FIG. 1, the system 100 includes a hierarchy of nodes including a number of portable devices 102, a number of point of service devices 104, a number of network gateways 106 and a number of back-end systems 108. In an alternative embodiment, the system 100 may include a number of portable devices 102, a number of point of service devices 104 and one back-end system 108.

In an exemplary embodiment, each node includes the following components: one or more service software agents, one or more modules for providing local data system services (such as, data acquisition and storage), one or more base communication modules for node to node communications, and a unique identifier permanently or dynamically assigned for identification within the system 100.

Figure 2:
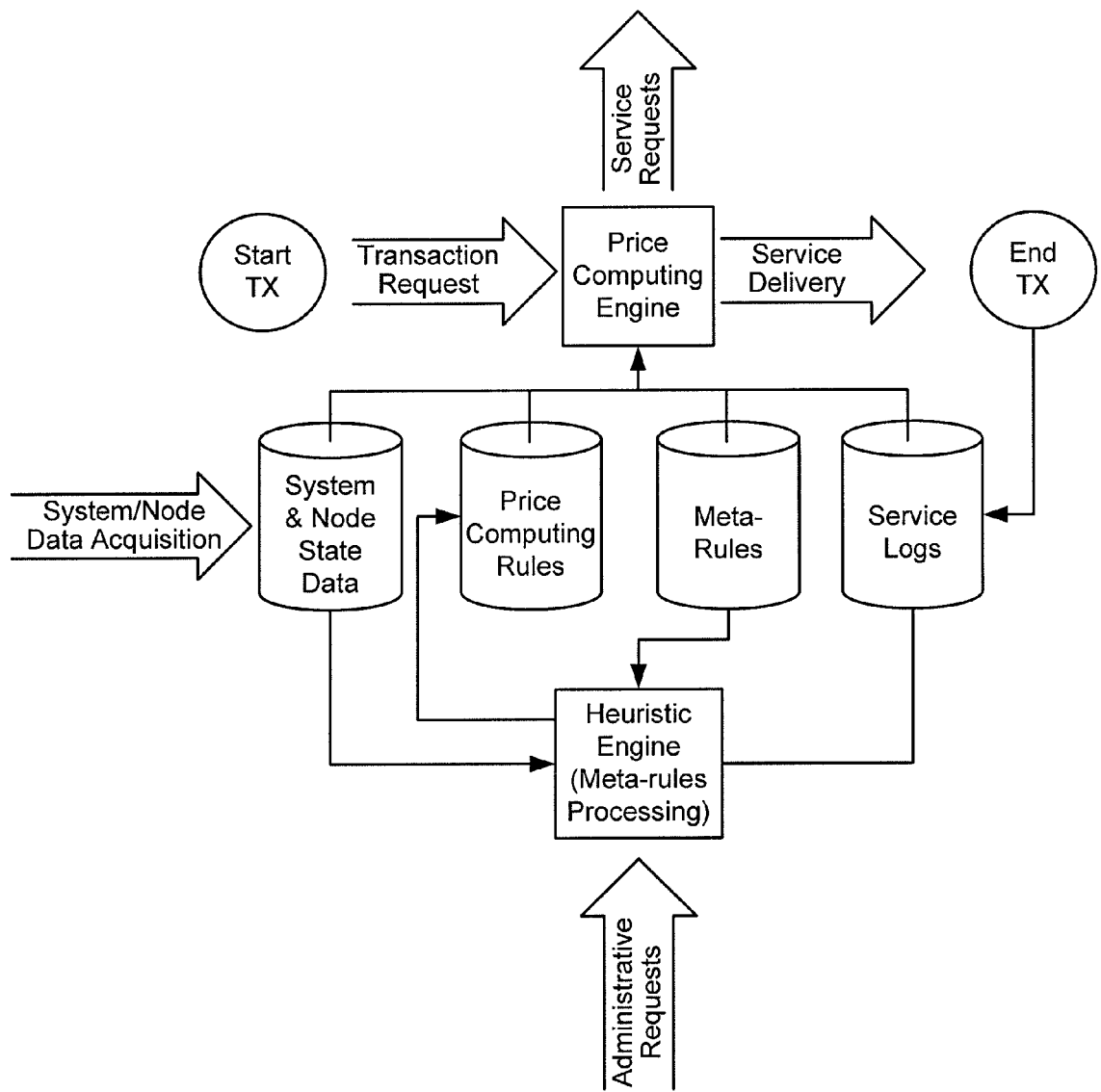
FIG. 2 is a simplified schematic diagram illustrating an exemplary embodiment of a software service agent according to the present invention.

In an exemplary embodiment as shown in FIG. 2, the service software agent includes a price computation engine, a price computation rules store, a meta-rules store, a heuristic engine for meta-rules processing and a communications module configured to interface with the node's base communication modules and/or other locally residing software service agent.

Portable Device Node Characteristics

A node that is a portable device 102 includes the following characteristics. Such node is optionally capable of interacting with a user through a number of devices or system including, for example, a display, a print-out system, a system capable of utilizing the sense of sight, a speaker or microphone, a system capable of utilizing the sense of hearing, a vibrating system, a keypad or a system capable of utilizing the sense of touch. Examples of portable devices 102 include, smart cards, personal digital assistants (PDAs), cellular phones, pagers, memory sticks, dongles and the like.

Point of Service Device Node Characteristics

A node that is a point of service device 104 includes the following characteristics. Such node is capable of communicating with the portable devices 102 via a number of means including, for example, radio frequency, infra-red, direct electrical means and the like. Such node is also capable of interacting with a user or point of service device operator through a number of devices or systems including, for example, a display, a print-out system, a system capable of utilizing the sense of sight, a speaker or microphone, a system capable of utilizing the sense of hearing, a vibrating system, a keypad and a system capable of utilizing with the sense of touch. Such node is further capable of communicating in a substantially real-time basis with a back-end system 108 directly or through a network switch/gateway 106.

The point of service device 104 includes software enabling and allowing the delivery of various types of services including, for example, secure storage of information such as unique device identification information, transaction event information, environmental information and system performance parameters. The point of service device 104 is also capable of measuring certain environmental information such as time, temperature, weather, geographical location. Examples of a point of service device 104 include a personal computer, point of sales device, kiosk, ATM, cellular phone, regular phone and the like.

Network Switch/Gateway Node Characteristics

A node that is a network gateway 106 has the following characteristics. Such node includes software and/or control logic to route service requests and administrative requests based on node identifiers. Such node is capable of communicating with point of service devices 106 and the back-end systems 108 on a substantially real time basis. Such node is further capable of providing peer-to-peer communications with other network switches 106. Communications with the point of service devices 104, the back-end systems 108 and other network gateways 106 are conducted in a secure manner. Examples of network gateways 106 include transaction stored and forward systems, payment network switches, payment network intercept or stand-in processing systems and the like.

Back-end System Node Characteristics

A node that is a back-end system 108 has the following characteristics: it is capable of communicating with point of service devices 106 on a substantially real time basis either directly or through the intermediary of a set of network switches 106. Such node includes software and/or control logic capable of managing price computation rules and meta-rules throughout the system 100. Such node includes software and/or control logic capable of collecting a variety of data including, for example, system state data and services logs, transaction (event) data. The node uses the collected data to perform a number of functions including, for example, reporting functions for the purpose of billing, identifying, managing and counteracting fraud occurring in the system 100 and allowing the system operator to monitor and achieve better system performance, and supporting customer service functions in particular dispute resolution and exception handling. Communications to and from the node may be provided in a secure manner.

Transaction Processing and Service Requests

A portable device 102 typically initiates a transaction by issuing a transaction request to a point of service device 104. Alternatively, the point of service device 104 may initiate a transaction on its own. When the point of service device 104 initiates a transaction or receives a transaction request for a transaction to be initiated, the software service agent within the point of service device 104 collects from the point of service device 104 and the portable device 102 such information as is necessary to determine the price for the goods and/or services to be provided during the transaction, computes the price for the transaction using the collected information and completes the transaction according to rules governing the transaction.

The point of service device 104 may have to "negotiate" with the portable device 102 to access such information as it requires, for instance, performing the necessary mutual authentication to ensure the security and integrity of the information exchanged. Such negotiation utilizes the price computation engine residing on the portable device 102. Thus, information used in the context of the transaction may be acquired, read from storage and/or computed by both devices. Examples of such types of information include time of day and temperature information which is acquired during the transaction, device identification and user information which is read from storage and transaction information including, for example, transaction number and transaction cryptogram, which is computed during the transaction.

In the event that the local price computation rules do not permit the point of service device 104 to arrive at a satisfactory outcome (i.e., a definitive decision between multiple processing options cannot be reached), the point of service device 104 may attempt to process the transaction by (1) substituting price computation rules per the local meta-rules book or (2) sending a service request to a higher order node which may be a network switch 106 or back-end system 108, if communication with such higher order node is possible. Such service request is then processed by the receiving node as if it was a transaction request to be processed locally according to the transaction processing rules and/or and the local price computation rules in place at that node. In the event that the receiving node is similarly unable to arrive at a satisfactory outcome, then the receiving node may attempt to process the transaction according to its meta-rules book or refer the transaction to a node of equal or higher order if possible.

System Management

A service provider is responsible for initializing the various system nodes in order to deliver services offered by such service provider. Such initialization may occur via a connection to the service provider's back end system or via injection locally on the individual nodes prior to their connection to the system 100. The service provider also defines the set of meta-rules to be used in the system 100. Such rules are defined for each participating nodes and include such definitions as rules of equivalence and rules of communications.

Rules of equivalence or meta-rules are rules that govern substitution of a price computation rule with another. Such substitution could formally be described as the definition of a local algebra across the n-space of applicable price computation rules as follow: If $\Sigma_n$ is defined as the n-space representing all possible system states, including system level data and node local data (acquired or computed), a price computation rule or operator can be defined as a numerical function $\mathcal{T}$ on $\Sigma_n$. System Performance is then defined as a numerical function $\mathcal{P}$ defining a topology for $\Theta_k$, the universe of possible price computation functions for the system. A meta-rule is then defined as a transfer function $\mathcal{M}$ from $\Theta_k$ into $\Theta_k$ with the following construction rule:

$$\mathcal{M}(\mathcal{T}_1, \mathcal{T}_2, \mathcal{T}_3, \ldots, \mathcal{T}_n) = \mathcal{T}_y \text{ if } \mathcal{T}(\mathcal{P}_y) \geq \mathcal{T}(\mathcal{P}_1, \mathcal{T}_2, \mathcal{T}_3, \ldots, \mathcal{T}_n)$$

Figure 3:
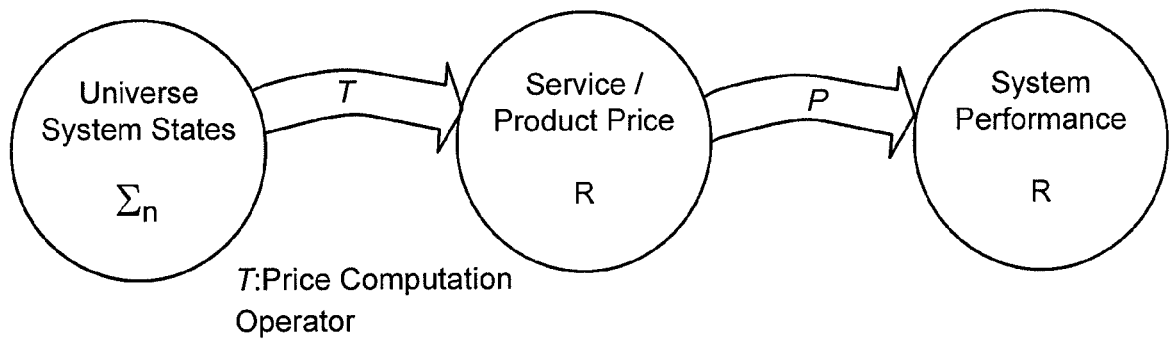
FIG. 3 is a simplified schematic diagram illustrating an exemplary embodiment of the meta-rules formalism according to the present invention.
Figure 3:
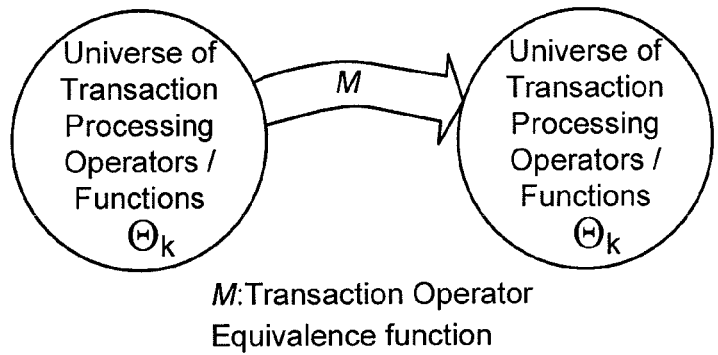

FIG. 3 is a simplified schematic diagram illustrating an exemplary embodiment of the meta-rules formalism according to the present invention.

Rules of communication dictate the instances and/or conditions under which service requests and administrative requests are performed. Requirements related to system overall security and integrity are included within such rules. This in particular includes the methods by which service and administrative requests are routed to the appropriate node and the process by which meta-rules are updated during an administrative request.

The service provider is responsible for the installation and/or distribution of the meta-rules to participating nodes. Initialization of system nodes includes the basic rules whereby meta-rules are received and locally updated. Subsequently, distribution of meta-rules books to system nodes can take several forms including, for example, injection in the node prior to its connection to the system, communication to the node specifically for receiving meta-rules book updates, and viral propagation from node to node of lower or equal order.

Once a system is operational, price computation rules book evolves locally per the conditions measured at that particular node as to the performance of the system. To ensure system integrity as well as provide the ability for the service provider to continuously upgrade the set of meta-rules, the system nodes from time to time may be required to provide different types of information to the back-end system including, for example, a copy of the then current local price computation rules book, a copy of the local price computation logs, and other local node state data. Such exchange of information is performed in response to an administrative request from the back-end system to nodes of lower order, which request may also include at that time data to update locally the transaction or price computation rules book, the meta-rules book and other system data such as identifiers, keys, etc.

Practical Examples

The following is a number of practical examples further illustrating the present invention as described above.

Distributed Loyalty System

Instead of a basic storage area in the portable and base device as is the case today, in one exemplary embodiment, the present invention provides the token with a heuristic function of modeling reward programs within an economic surface area. Such a surface area is delimited by three (3) or more equations, each equation representing a consumer behavior model that a sponsor develops to maximize revenue based on economic formulas encompassing consumer past behavior, product generation cost and profitability.

Figure 4:
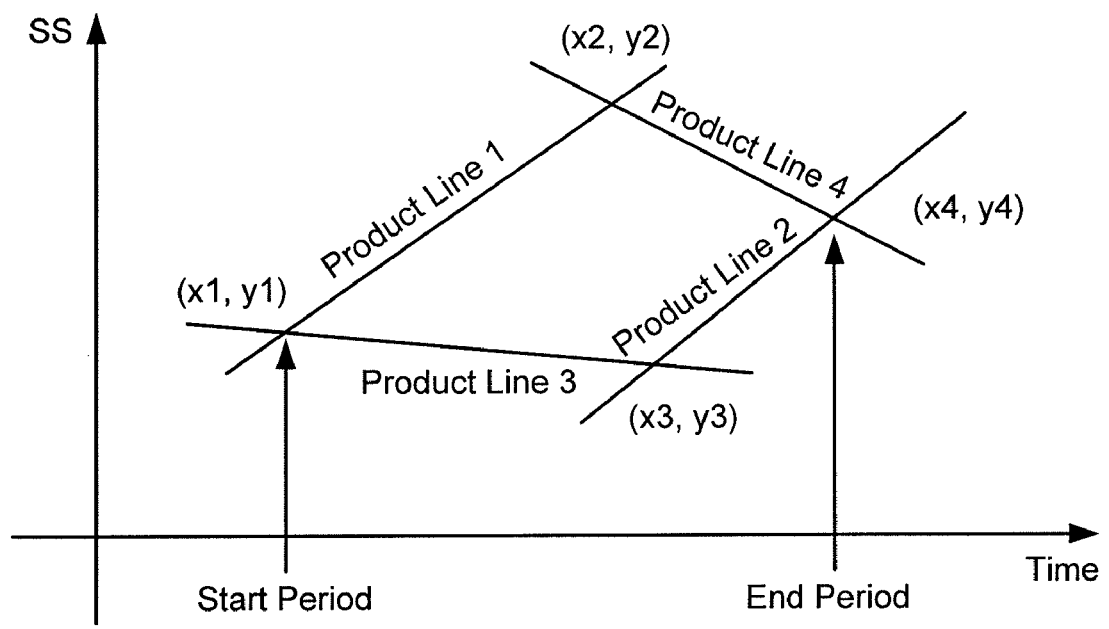
FIG. 4 is a simplified diagram illustrating various distributed adaptive loyalty schemes that can be implemented according to the present invention.

In one exemplary embodiment, the present invention is used to implement various distributed adaptive loyalty schemes as shown in FIG. 4. The traditional purchase transaction can be described as stimulus. The rewards, coupons, discounts, passes, are a loyalty system's responses. The new system's stimulus/response mechanism provides portable and base devices with portable rules engine (distributed) having the ability to function in real-time to create closed-loop, modular system for repeatedly accepting stimulus and providing adaptive responses.

Adaptive responses are offered at the point of service. According to one exemplary aspect, each transaction is analyzed and a user's individual profile is updated. The profile determines the appropriate scheme rules and thresholds to utilize.

The result of the data mining functions then generates such equations, which could be updated on a regular basis. Instead of downloading parameter files, the back-end system rules engine downloads the new equations and their coordinates ((x1, y1), (x2, y2), etc). Each and every equation is an economic model that encapsulates a minimum and maximum value for a given set of products, e.g., dairy products like cheese, milk, yogurt, with specific reward functions, get one free, 18% off etc. Generically speaking, an algebra for every space is generated, the intersection of spaces constitutes the economic reward that is provided to the consumer.

If the consumer does not buy within the proposed multidimensional area (as shown in FIG. 4 (it is a 2-space system because of the difficulty of representing an n-space system), it requires the portable device request a change in parameters and translates into a change of slope of the linear programming equation changing elements in some of the spaces. With the present invention, the stimulus is not just limited to purchase transactions but includes transactions initiated from other use of the portable device, for example, balance/status queries (no purchases) and access device. In addition, more dimensions of stimuli can be captured and analyzed at the point of sale thus allowing the system to deploy more effective responses. For example, traditional stimuli capture transactional data, i.e., whether purchase was made or not. According to one exemplary embodiment, with a distributed adaptive system, stimulus data can encompass spatial (where), historical (purchase history) and temporal (when) dimensions.

Vending Machines with Adaptive Pricing

Vending machines are generally off-line devices that are designed to deliver goods for a set price. The price may be adapted according to each device but is generally done arbitrarily. Yet many instances would exist to optimize the performance of a given device. The performance of a device could be defined as the maximization of profit margins generated by the device, the maximization of sales per device and the optimization of service calls for the device.

Each of these performance criteria can become the foundation for a set of price setting rules used to fluctuate the price of the goods delivered according to the environment. For instance, soda machines might increase their price when the ambient temperature increases due to the expected increase in demand. Through the use of a local heuristic engine, the elasticity of demand vs. price and temperature can be plotted and extrapolated and therefore prices may be constantly adjusted. Such a method may be used to either maximize profit or to maximize sales, to ensure that most of the demand for the beverages is captured. Other parameters that might easily influence the price of the goods could include the time of day and day of the week, effectively taking into account the sensitivity of demand according to these parameters.

One issue with vending machines is the need to adequately replenish them. In the event of available communications link, a machine might "call for service". Alternatively the machine may use inventory control and pricing methods to maximize the number of sales in between scheduled service visits, thus reducing the overall cost of servicing the machine and optimizing the sales per unit. Through this example, it can be seen that price can thus be set according to a set of computation rules (in this instance, the price as a function of the goods selected) and meta-rules, comparing the measured vs. desired performance of the system (profit, sales, service calls, etc.) and the measured sensitivity to various local parameters (temperature, time, time to next visit . . . ) to adapt locally the price of the goods delivered, without requiring a central intervention. Furthermore, service logs (in this case the evolution of sales vs. price as a function of the other registered parameters) may be used by the goods distributors to develop more efficient meta-rules where multiple parameters and rules may be used to evolve product pricing.

Adaptive Targeted Offering

Adaptive targeted offering allows the intelligence distribution within the system. Hence, the rules can be locally updated by the portable device, the point of service device or the network gateway with certain predetermined and defined parameters to provide equivalent offers. This is a powerful tool to allow a very flexible adaptation to the given environment and the buying habits of the portable device user. The offers can be modified to motivate the portable device users to try offers they would not otherwise have tried without the help of the incentives. The intelligence in the systems allows a certain level of neural learning within the system enhanced by the feedback loop created by the adaptation of the offers and the measurement of the response.

Figure 5:
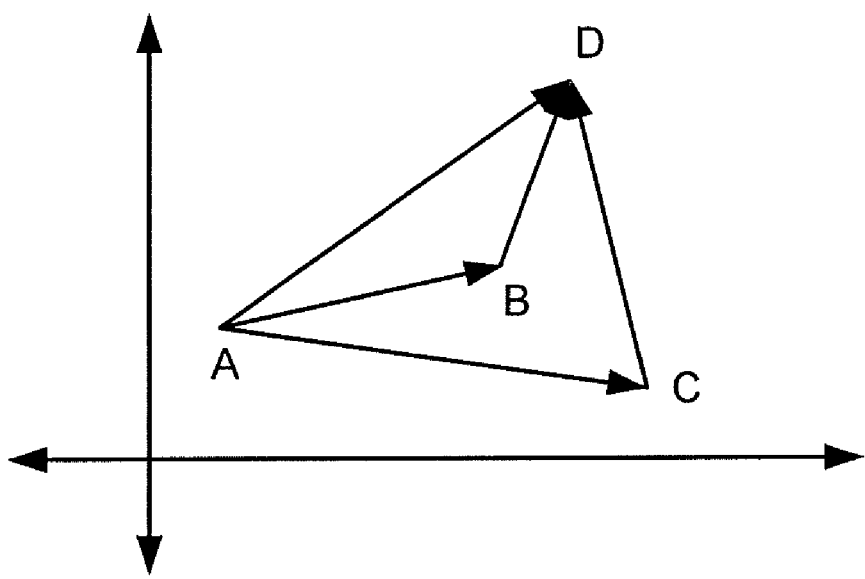
FIG. 5 is a simplified diagram illustrating the concept of equivalent offers using vector theory according to one exemplary embodiment of the present invention.
Figure 6:
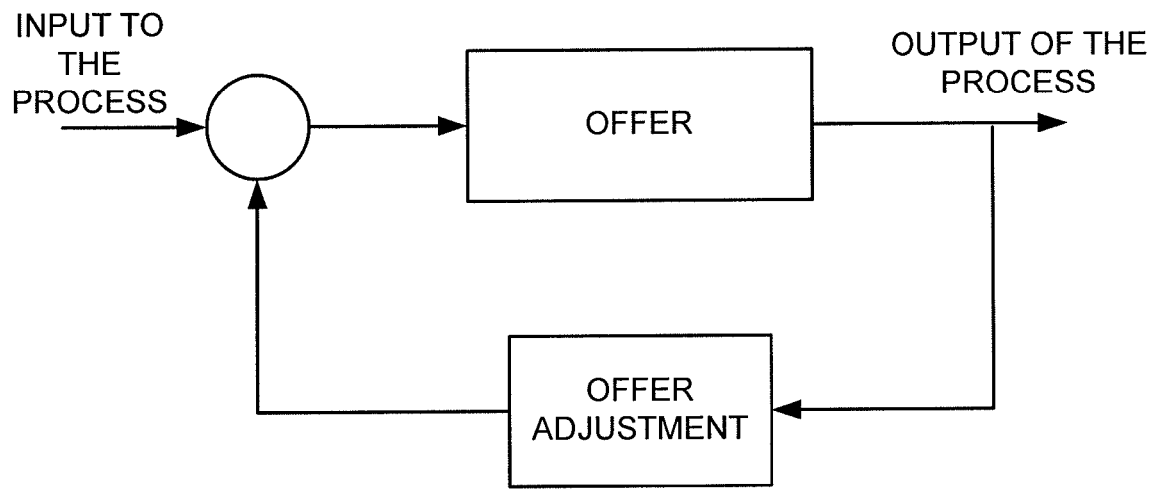
FIG. 6 is a simplified diagram illustrating an offer feedback loop according to one exemplary embodiment of the present invention.

The concept of equivalent offers can be easily explained using vector theory as shown in FIG. 5 where the offer depicted by vector AD is equivalent to the two step offer depicted by vectors AB and BD as well as vectors AC and CD. FIG. 6 illustrates a feedback loop which provides the means to adjust the offers based on the previous execution and provides the necessary means to stabilize the purchasing behavior.

Benefits of the present invention relate to its ability to increase the value derived from a transactional system without incurring significant networking costs. In fact, given the presence of heuristic components in every system node to potentially adapt price computation as a function of system performance, the role of back-end systems becomes more one of monitoring system states and performance and propagating updates to the meta-rules book to continuously enhance the overall system performance.

The present invention is applicable to a number of systems related to payment applications. Furthermore, the present invention is described in terms that allows it to cover the breadth of emerging forms of payment tokens including application that would include heuristics for price computation, or provide for distributed management of price computation systems.

The present invention could be expanded beyond the notion of dynamic pricing to other decisions that might be performed at the point and time of service. Thus, this invention may be expanded further into fields that involve decision making with a consumer token. It is, for instance, possible to envision such an approach being used in areas such as traveler security. Equally, the present invention could play a role in the emerging contactless applications.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method associated with a point of service device and a portable device, the method comprising:
   interacting with the portable device in a transaction, wherein the point of service device is associated with a plurality of rules and plurality of meta-rules; and
   determining, by the point of service device, if the rules can be altered locally to determine an outcome for the transaction, and if the rules cannot be altered locally, then requesting a service provider system to help determine the outcome for the transaction, wherein the portable device and the point of service device are further configured so that when the portable device and the point of service are unable to determine the outcome for the purchase transaction, the point of service device uses its plurality of meta-rules to either determine whether one or more of the plurality of rules in either the portable device or the point of service can be altered locally in order to determine the outcome or request a service provider system to help determine the outcome using the plurality of rules and the plurality of meta-rules in the service provider system.

2. The method of claim 1, wherein the portable device is associated with a plurality of rules and a plurality of meta-rules.

3. The method of claim 1, further comprising receiving an administrative request, from the service provider system, wherein the administrative request includes an update to the plurality of rules and an update to plurality of meta-rules associated with the point of service device, and a time to perform the update.

4. The method of claim 1, wherein the point of service device uses historical transaction information to alter locally the plurality of rules and plurality of meta-rules associated with the point of service device.

5. The method of claim 1, further comprising measuring, by the point of service device, environmental information, including time, temperature, weather, or geographical location.

6. The method of claim 5, wherein the point of service device uses the environmental information to update the plurality of rules and plurality of meta-rules associate with the point of service device.

7. The method of claim 1, further comprising collecting information from the portable device to determine the outcome.

8. A point of service device, comprising:
a processor; and
a computer readable medium comprising code executable by the processor to perform a method associated with the point of service device and a portable device, the method comprising:
  storing a plurality of rules and a plurality of meta-rules associated with the point of service device;
  interacting with the portable device in a transaction; and
  determining if the rules can be altered locally to determine an outcome for the transaction, and if the rules cannot be altered locally, then requesting a service provider system to help determine the outcome for the transaction, wherein the portable device and the point of service device are further configured so that when the portable device and the point of service device are unable to determine the outcome for the purchase transaction, the point of service device uses it plurality of meta-rules to either determine whether one or more of the plurality of rules in either the portable device or the point of service device can be altered locally in order to determine the outcome or request a service provider system to help determine the outcome using the plurality of rules and the plurality of meta-rules in the service provider system.

9. The point of service device of 8, wherein the point of service device is further configured to measure environmental information including the time, temperature, weather, or geographical location.

10. The point of service device of 9, wherein the point of service device is configured to store information, including unique device identification information, transaction event information, and environmental information, and system performance parameters.

11. A method associated with a service provider system and a point of service device, the method comprising:
  communicating through a network gateway with the point of service device;
  collecting data at the service provider system, from the point of service device, wherein the service provider system is associated with a plurality of rules and a plurality of meta-rules;
  receiving a request from the point of service device to help determine an outcome for a transaction; and
  determining, by the service provider system, the outcome for the transaction, wherein the point of service device is further configured so that when the service provider system and the point of service device are unable to determine the outcome, a processor in the service provider system uses its plurality of meta-rules to either determine whether one or more of the plurality of rules in either the point of service device or the service provider system can be altered in order to determine the outcome.

12. The method of claim 11, further comprising:
  determining, by the service provider system, an update to the plurality of rules and plurality of meta-rules associated with the point of service device; and
  routing an administrative request to the point of service device.

13. The method of claim 12, wherein the administrative request includes an update to the plurality of rules and an update to plurality of meta-rules associated with the point of service device, and a time to perform the update.

14. The method of claim 11, wherein the data collected from the point of service device includes system state data and transaction event data.

15. The method of claim 11, wherein the service provider system uses historical transaction information to update the plurality of rules and plurality of meta-rules associated with the point of service device.

16. The method of claim 11, wherein the service provider system and the point of service device communicate in real-time.

17. The method of 11, the method further comprising:
  defining, at the service provider system, a plurality of rules and a plurality of meta-rules associated with a point of service device; and
  distributing and installing, from the service provider system to the point of service device, the plurality of rules and the plurality of meta-rules associated with the point of service device.

18. A service provider system, comprising:
a processor; and
a computer-readable medium, comprising code executable by the processor to perform a method associated with the service provider system and a point of service device, the method comprising:
  storing a plurality of rules and a plurality of meta-rules associated with the service provider system;
  communicating through a network gateway with the point of service device, wherein the point of service device is associated with a plurality of rules and a plurality of meta-rules;
  collecting data at the service provider system, from the point of service device;
  receiving a request from the point of service device to help determine an outcome for a transaction; and
  determining, by the service provider system, the outcome for the transaction, wherein the point of service device is further configured so that when the service provider system and the point of service device are unable to determine the outcome, the service provider system uses its plurality of meta-rules to either determine whether one or more of the plurality of rules in either the point of service device or the service provider system can be altered in order to determine the outcome.

19. The system of 18, wherein the service provider system is configured to route an administrative request to the point of service device.

20. The system of claim 19, wherein the administrative request includes an update to the plurality of rules and an update to the plurality of meta-rules associated with the point of service device, and a time to perform the update.

* * * * *